G. WEISS.
BOTTLE WASHING MACHINE.
APPLICATION FILED DEC. 23, 1908.

1,003,223.

Patented Sept. 12, 1911.

G. WEISS.
BOTTLE WASHING MACHINE.
APPLICATION FILED DEC. 23, 1908.

1,003,223.

Patented Sept. 12, 1911.

G. WEISS.
BOTTLE WASHING MACHINE.
APPLICATION FILED DEC. 23, 1908.

1,003,223.

Patented Sept. 12, 1911.
8 SHEETS—SHEET 7.

UNITED STATES PATENT OFFICE.

GEORGE WEISS, OF CHICAGO, ILLINOIS, ASSIGNOR TO THE 20TH CENTURY MACHINERY COMPANY, OF CHICAGO, ILLINOIS, A CORPORATION OF ILLINOIS.

BOTTLE-WASHING MACHINE.

1,003,223.  Specification of Letters Patent.  Patented Sept. 12, 1911.

Application filed December 23, 1908. Serial No. 468,914.

*To all whom it may concern:*

Be it known that I, GEORGE WEISS, a citizen of the United States, residing at Chicago, Cook county, Illinois, have invented certain new and useful Improvements in Bottle-Washing Machines, of which the following is a specification.

My invention relates to machines for the washing of bottles and the object thereof is to provide a novel and comparatively simple and reliable machine of this character capable of efficiently washing the bottles both exteriorly and interiorly and in an automatic manner, from the automatic feeding of the bottles from the usual soaking machine to the delivery of the bottles in perfectly cleansed condition.

By preference my machine is adapted to act upon a plurality of bottles simultaneously, the machine herein illustrated being capable of acting upon series of twelve bottles at a time, the same being first presented to devices for washing the exterior of the bottle, particularly the part of the bottle to which the label was attached, the same being the hardest part of the exterior of the bottle to wash, such bottles being subsequently presented to mechanism working on the turret system for preliminarily rinsing the interior of the bottle to thoroughly cleanse the same from all trace of the soda solution of the soaking tank, then presented to a brushing device for brushing and scouring the interior of the bottle, subsequently presented to another rinsing device for cleansing the same more particularly of any bristles from the brushes, and finally presented to an ejecting device which automatically ejects the bottles from said mechanism.

Notwithstanding the considerable range of work performed by my machine, and the fact that it operates on such a large number of bottles at the same time, such machine is simple and compact and is moreover automatic in all its operations, from the reception of the bottles to their delivery from the machine. Furthermore, my machine is so constructed that it is enabled to accommodate different sizes of bottles, the general sizes in practice being quart bottles, pint bottles and half-pint bottles, differing of course both in height and diameter.

The various features of novelty and utility in my machine will be apparent from the description hereinafter given.

According to the present embodiment of my invention, my bottle washing machine is intended and adapted to work in connection and in unison with the well-known bottle soaking machine which is adapted to carry the bottles in racks on an endless chain through a proper solution such as a soda solution and thereby soak the bottles. In the present instance and as a part of an automatic and complete system, the bottles are automatically delivered from the pockets or racks of the bottle soaking machine and thereby delivered to my bottle washing machine, which acts upon and thoroughly cleanses the bottles in an automatic manner and without the intervention of any manual operations whatsoever after the machine has been adjusted to work upon any particular size of bottle. However, it will be understood that it is not essential that my bottle washing machine should thus work in conjunction with the bottle soaking machine, but that the bottles may be fed to my bottle washing-machine by hand or automatically in any other way, as found desirable. Moreover, it will be understood that the principle of my invention may be embodied in a machine capable of working upon a single line of bottles, although for the sake of speed I prefer to adapt my machine for working upon pluralities of bottles at the same time, in the present instance series of twelve bottles being acted upon simultaneously.

Figures 1, 19, 20:
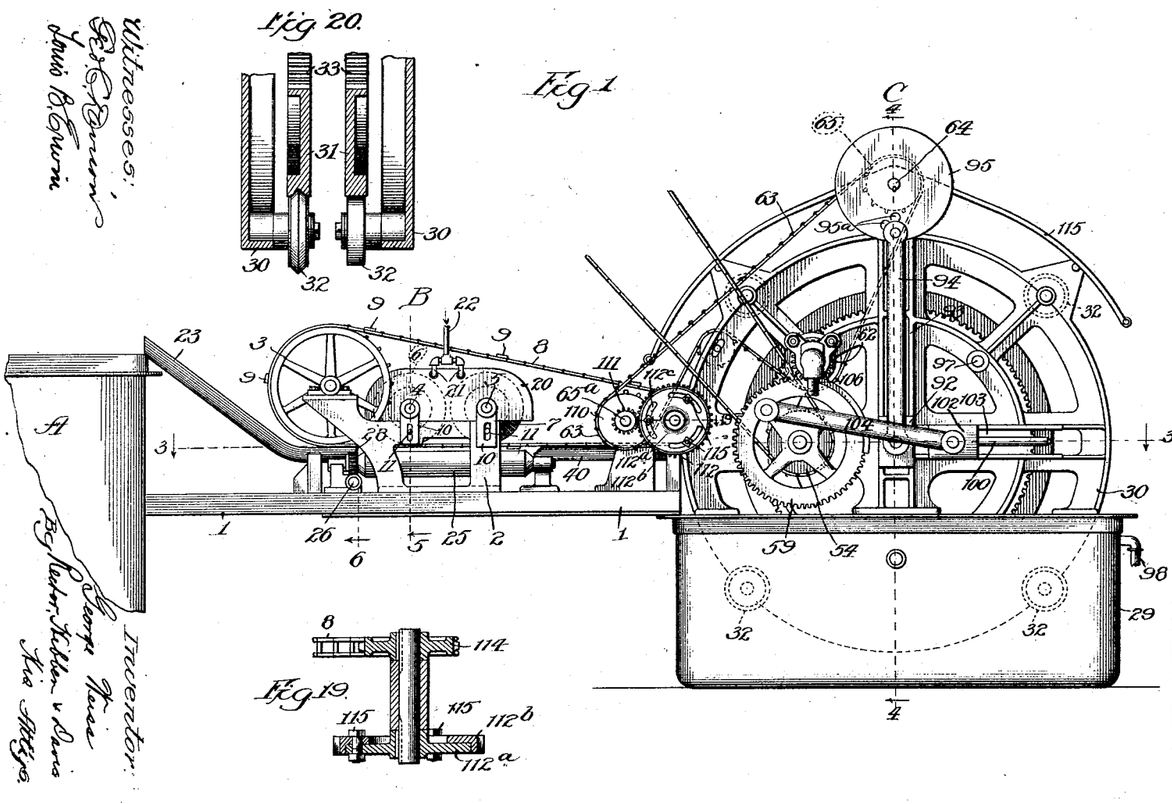
Figure 1 is a side elevation of my machine.
Fig. 19 a detail view of an adjustable gear.
Fig. 20 detail section of rolls for guiding carriage.

Referring to the machine as herein illustrated, I will state preliminarily that the bottle soaking machine is located at the left-hand end of my bottle washing machine (Fig. 1) and that my machine comprises two main divisions, namely, mechanism indicated generally by the reference character B for cleansing the exterior of the bottle and the mechanism indicated generally by the reference character C for cleansing the interior of the bottle, all as clearly indicated in Fig. 1.

The mechanism B, which is mounted upon a main support 1 of any suitable character, comprises a main frame 2 having suitable bearings for the two sprocket wheels 3 and the two shafts 4 and 5 which constitute the shafts of the rotatable brushes 6 and 7 respectively. The two sprocket wheels form a part of an endless conveyer, which also comprises the two similar endless chains 8 connected at suitable predetermined intervals by means of cross bars 9 which are adapted to engage and feed the bottles in the manner hereinafter explained.

Referring to the brushes 6 and 7, the shafts 4 and 5, instead of having their bearings directly upon the frame 2, are provided with bearing boxes 10 which are mounted for vertical adjustment by the bolt and slot connection indicated at 11 in Fig. 1, with the result that the brushes may be raised or lowered to accommodate the particular size of bottles passing through the machine. These brushes are rotated in the same direction, that is in a clockwise direction, when the machine is viewed as in Fig. 2, which direction is opposite to the direction of feed of the bottles, which facilitates the cleansing operation. These brushes may be rotated by any suitable driving connections, but referring to the illustrated arrangement the power is derived from the main drive shaft 12 (Fig. 2) and transmitted by means of a sprocket wheel 13, sprocket chain 14, to the outer sprocket wheel 15 which is secured to one end of the brush shaft 5, Fig. 3. The power is transmitted to the other brush shaft 4 by means of a sprocket chain 16 extending over a sprocket wheel 17 on one end of the brush shaft 4, such chain also extending around and driving another sprocket wheel 18 operating the rotating rollers hereinafter described and being provided with a chain tightener 19, Figs. 2 and 3. The brushes are enveloped except as to their lower portions by means of a casing or hood 20, on whose upper inner surface are supported two water supply pipes 21 for supplying the necessary water for the brushing and cleansing operations, such pipes being connected with a suitable source of water under pressure admitted through the supply pipe 22, Fig. 1. In the present instance, where twelve lines of bottles are accommodated by my machine these brushes are of sufficient width to extend entirely across the machine, as indicated in Fig. 3.

Figure 6:
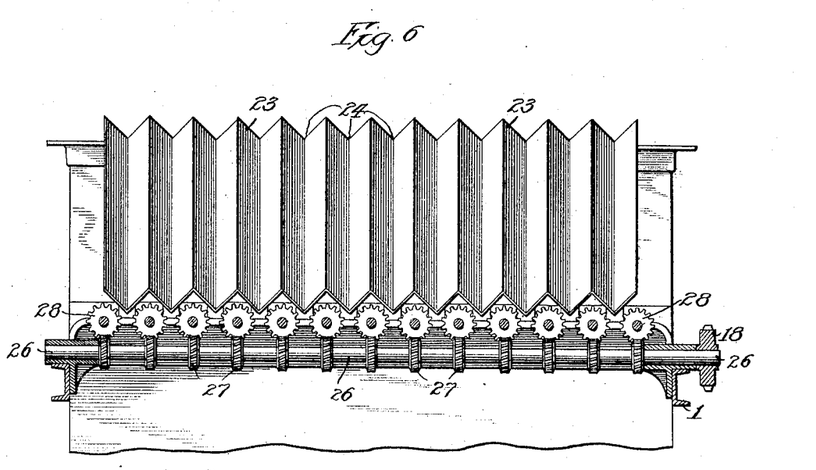
Figure 7:
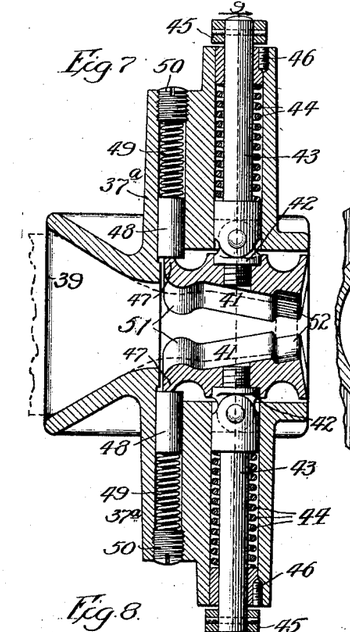
Fig. 7 an enlarged section on the line 7—7 of Fig. 8 illustrating one of the bottle holding chucks or heads.
Figure 8:
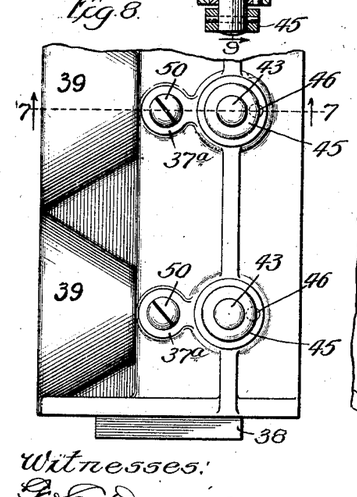
Fig. 8 a plan view of two of the bottle-holding heads.
Figure 9:
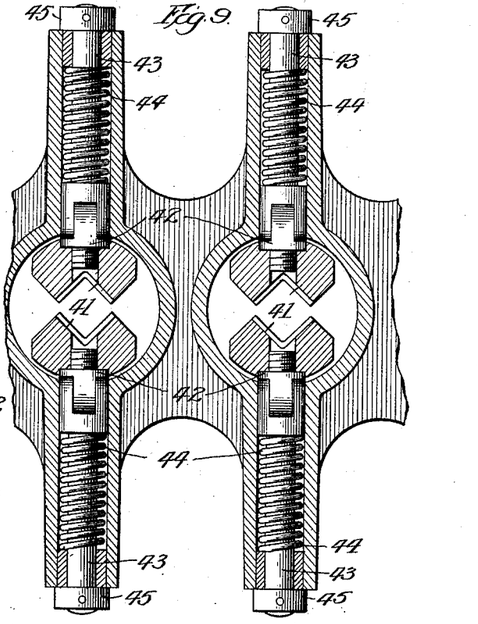
Fig. 9 a section on the line 9—9 of Fig. 7.
Figure 10:
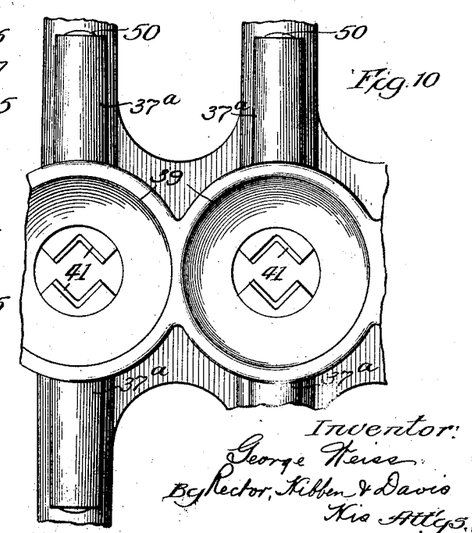
Fig. 10 an elevation illustrating the front opening of two of the bottle heads or chucks.
Figure 11:
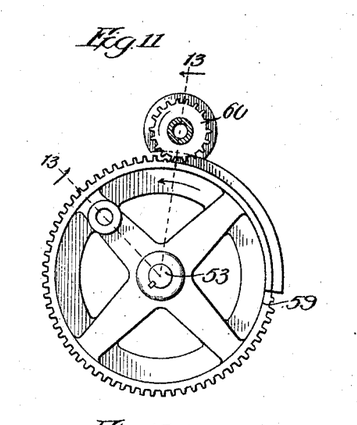
Fig. 11 an elevation of one of the mutilated gears and its pinion.

The bottles are fed downwardly upon an inclined chute or feed table 23 which in practice is made of sheet metal and so shaped as to form the plurality of grooves 24, Fig. 6, along which the bottles pass lengthwise. The bottles feed down these grooves by gravity and travel within the range of the cross bars 9 of the endless conveyer which contact the bottoms of the bottles and advance them to the brushes, the bottles being fed head on, as indicated in Fig. 2.

Immediately below the brushes is arranged a series of positively rotated rollers 25 which are located in the same horizontal plane in close proximity to each other and are so disposed that the grooves or spaces between them coincide with the grooves 24 of the inclined feed-way, such rollers constituting a part of the feed table, at least that part of the table below the brushes. The object of these rollers is to rotate the bottles while being acted upon by the brushes so that the entire outer surface of the bottles will be exposed to the brushing action. These rollers may be rotated in any suitable manner, but in the present instance the same are rotated from the sprocket wheel 18 hereinbefore referred to, which is mounted upon the cross shaft 26 having the series of spiral gears 27 coöperating with the series of spiral gears 28 secured to one end of the rollers.

Figure 2:
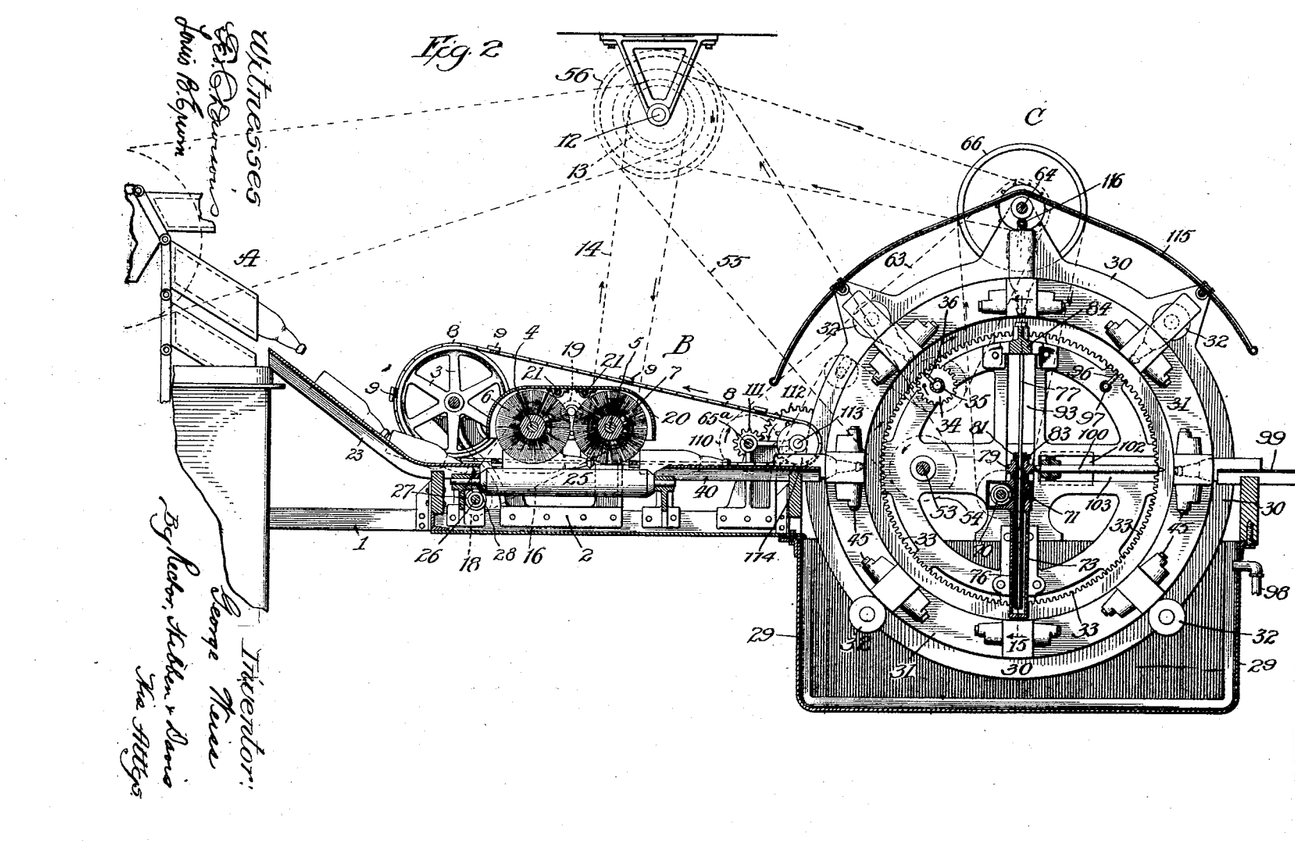
Fig. 2, a central longitudinal section of the machine.
Figure 3:
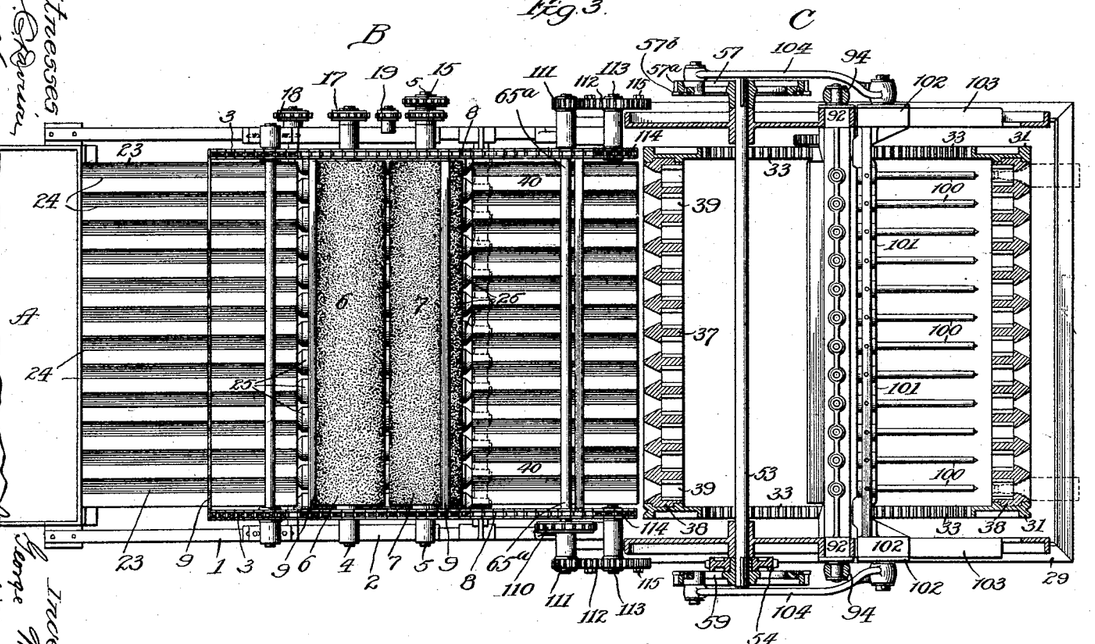
Fig. 3 a sectional plan on the line 3—3 of Fig. 1.
Figure 4:
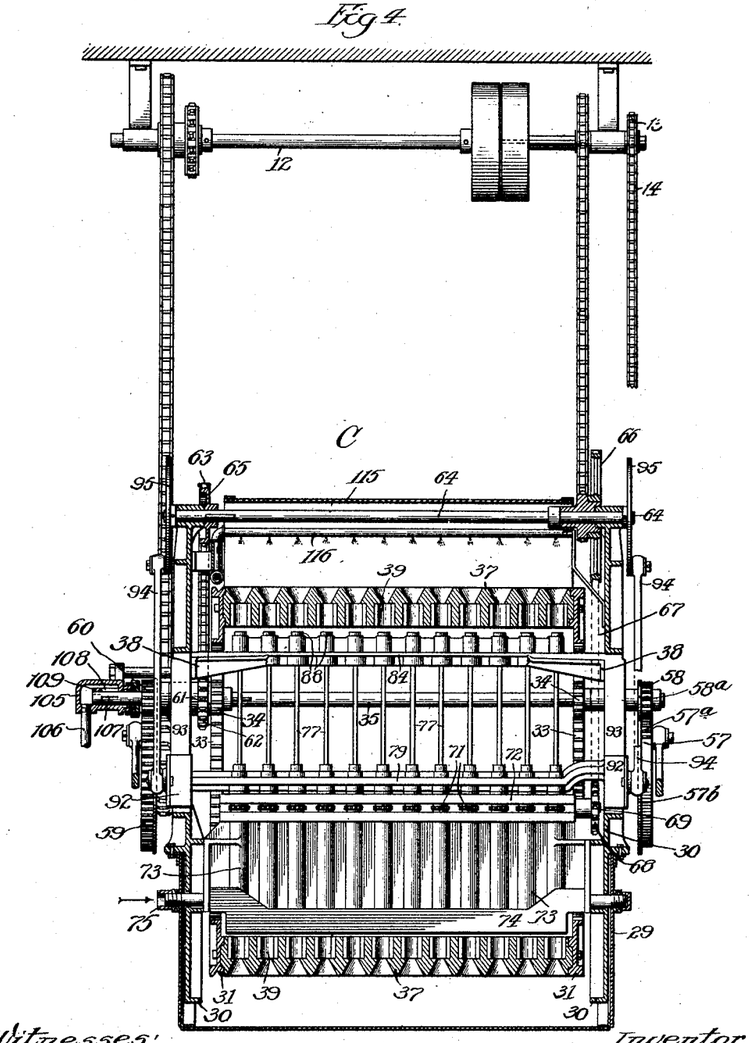
Fig. 4 a vertical section on the line 4—4 of Fig. 1.
Figure 5:
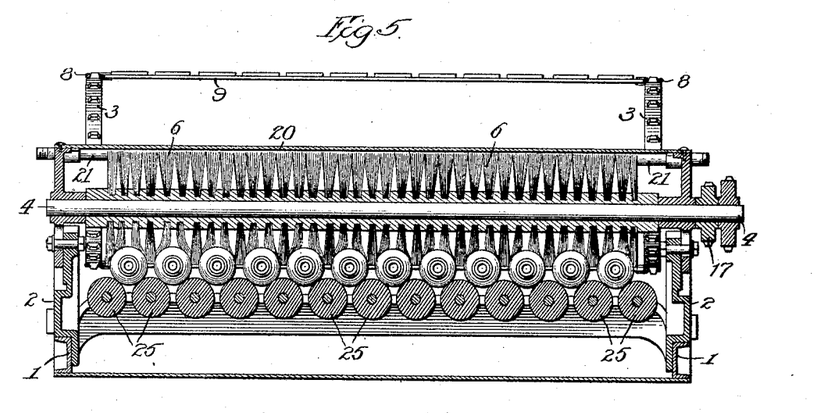
Figs. 5 and 6 sectional elevations on the lines 5 and 6 respectively of Fig. 1.
Figures 13, 14:
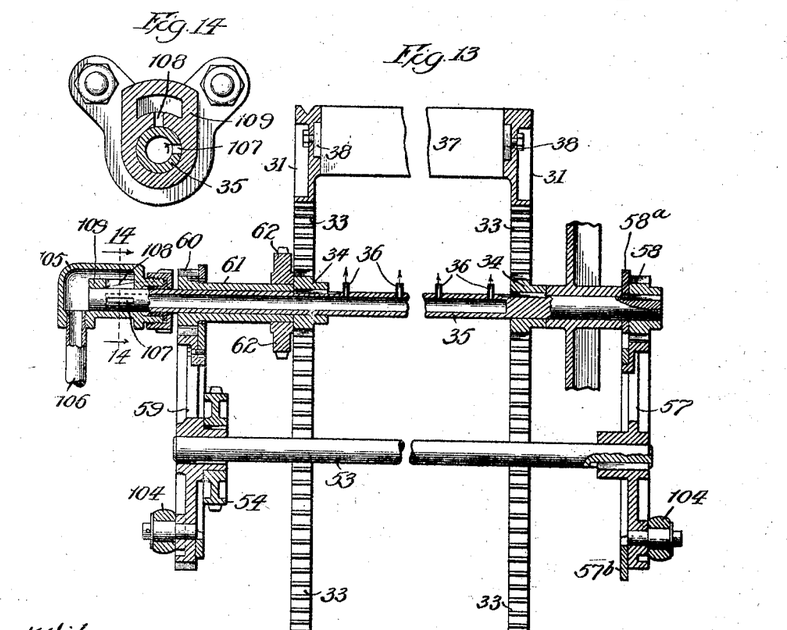
Fig. 13 a detail view, the same being a substantially vertical section the line of which is indicated by the section lines 13 of Figs. 11 and 12.
Fig. 14 a section on the line 14 of Fig. 13.

Describing the machine as thus far explained, the bottles which are fed down the feed way 23 fall by gravity within the range of the endless conveyer one of whose bars 9 will engage the bottom of the bottles and advance them to a position under the first brush as shown in Fig. 2. The movement of the conveyer is intermittent and the timing is such that the conveyer will stop in the position stated so that the bottle will be presented to one of the brushes a comparatively long time in order that the part of the bottle to which the label has been applied will be thoroughly cleansed and all the label applying substance has been removed. During this operation the rollers 25 will rotate the bottle, the motion of the rollers being in fact continuous. At the proper time the conveyer moves and thereby advances the bottle past the second brush, where it is further acted upon, after which the bottles continue in such intermittent fashion to the mechanism for cleansing the interior of the bottle, which mechanism will now be described. This second mechanism comprises essentially a ring-like structure supported or mounted for rotation at its periphery, thereby having an open center, such structure depending into the tank 29 and being supported by the frame 30, the lower portion of which extends into the tank. The structure referred to comprises two parallel metallic rings 31 between which are interposed the series of bottle holding heads or chucks hereinafter described in detail, which, in the present instance, are in eight series. The peripheries of these rings constitute tracks which run upon rollers 32 mounted upon the frame 30, two pairs of which rollers being supported within the line of the tank and the other two pair being supported by the upper portion of such frame, as indicated in Figs. 2 and 4. By preference the rollers on one side of the machine are grooved as seen in Fig. 20, while those on the opposite side are made plain faced in order to accommodate practical conditions. The inner faces of the rings 31 are provided with internal gears 33 which mesh with and are driven by the pinions 34, as clearly indicated in Figs. 2, 4 and 13. These pinions are secured to a cross-shaft 35 which is hollow, thereby acting as a water supply pipe, to which end it is supplied with a series of twelve nozzles 36, Figs. 2 and 13, for injecting water into the bottles as hereinafter explained. The pinions 34 are so related to the gears 33 that one revolution of said pinions will move the ring structure ⅛ of a revolution so as to bring one series of the bottle holding heads or chucks from receiving position to its first active position or situation, all as hereinafter fully explained.

Referring next to what I term the bottle-holding heads or chucks, there are eight series of twelve each of these chucks, the same being arranged in the ring structure equidistantly so as to present eight stages or stations in the intermittent or turret-like operation of the ring structure. Each series of these chucks and each chuck of itself is similar, so that a description of one series and a detailed description of a single chuck will suffice for all.

As shown more particularly in Figs. 3 and 4, each series of chucks consists essentially of a transverse bar 37 whose ends are extended to form feet 38 as a means of attachment to the inner faces of said rings 31. The bar is provided with a series of twelve openings 39 corresponding in number and in position with the twelve lines of feed of bottles, it being understood that the feed table 40 in front of the brushes 6 and 7 is grooved in accordance with the remainder of the feed table so that the bottles may be fed properly to the mechanism now being described.

Referring to the details of the bottle chucks as illustrated in Figs. 7 to 10, each chuck comprises within the opening 39 a pair of jaws 41 which are of the peculiar shape and are mounted in the peculiar manner shown. The jaws are mounted for practical and universal movement in order to accommodate themselves to different shapes and forms, as well as irregularities in bottle necks. As shown more particularly in Fig. 7, each jaw is provided with a lateral screw stud 42 which is pivotally connected to the head or inner end of rod 43 which is spring-pressed inwardly by means of the spring 44, the inward movement being limited by means of the collar 45 and adjusted by means of the adjusting nut 46. By these means the jaws 41 are permitted a bodily outward or radial movement, but in addition these jaws are permitted another or oscillating movement on the inner ends of the rods 43 as a fulcrum. For this purpose the outer ends 47 of the jaws contact spring-pressed pins 48 movable inwardly in bores formed in the bar extensions 37$^a$ and pressed inwardly by means of the springs 49 which tension may be adjusted by means of the adjusting nuts 50. By these combined movements practically a universal movement is permitted to the jaws 41 to accommodate different bottle necks as stated. As shown and by preference, the jaws are formed with inwardly swelled portions 51 at their outer ends and with the shoulders 52 at their inner ends, such shoulders being adapted to engage the usual flange at the outer end of the bottle neck. Moreover, the jaws are so made as to hold the bottles in perfect alinement, which is essential, particularly in respect to the interior brushing operation hereinafter described, and for this purpose the jaws are adapted by reason of their swelled or expanded portion 51 to bear against the shoulder of the bottle at the junction of the neck and body portions.

Figure 12:
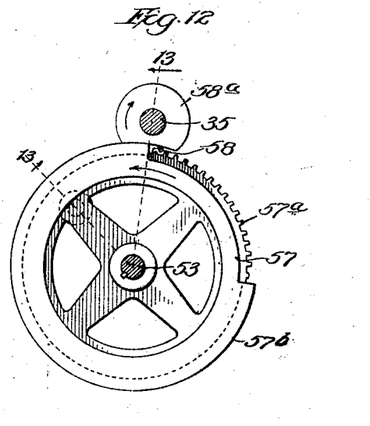
Fig. 12 an elevation of another mutilated gear and its pinion.

The different parts connected with the mechanism C are operated and timed with respect to a master shaft 53 extending transversely of the machine structure and provided near one end with a sprocket wheel 54 which is operatively connected with the drive shaft 12 by means of the sprocket chain 55 and sprocket wheel 56, as indicated in Fig. 2. To one end of the master shaft is secured a mutilated gear 57 which is adapted to mesh with and drive a pinion 58 secured to one end of the shaft 35 hereinbefore referred to. The driving gear 57 is so constructed that although mutilated, its active or geared portion 57$^a$ is of sufficient length to rotate the pinion 58 once in one rotation of the former—in the present instance about ninety degrees of the gear 57 being provided with gear teeth as indicated in Fig. 12. The gear 57 is provided adjacent the flat portion of its periphery with a marginal flange 57$^b$ which is arranged to coöperate with a similar flange 58$^a$ on the pinion 58 and to have frictional contact therewith in the manner illustrated in Fig. 13, so that in the operation of these parts the same will not overthrow by momentum, the frictional resistance between such flanges preventing such overthrow. Inasmuch as the pinion 58 is secured to the shaft 35, the latter will be rotated once for every rotation of such pinion and its driving gear 57. To the other end of the master shaft 53 is secured the driving gear 59 similar to the driving gear 57 in that it is mutilated but differing therefrom in the reversal of the main or active and inactive portions thereon inasmuch as in respect to the driving gear 59 only 90 degrees of its periphery is inactive, the remainder being provided with gear teeth adapted to mesh with a pinion 60, having a hub 61 mounted to rotate loosely upon said shaft 35. The relative number of teeth on the gear 59 and the pinion 60 is such that the pinion will be rotated three times during three-quarters of the rotation of the driving gear 59 and will remain idle during the remaining quarter movement. To the hub 61 is secured a sprocket wheel 62 over which passes a sprocket chain 63 for driving a shaft 64 at the upper portion of the mechanism C\and also a shaft 65$^a$ for operating the nozzles and chains 8 as hereinafter explained. Referring to the driving shaft 64 and its associated parts, the sprocket chain 63 coöperates with the sprocket wheel 65 on said shaft 64, which shaft extends transversely of the machine as indicated in Fig. 4. At the end of this shaft opposite the point of attachment of the sprocket wheel 65 is secured another sprocket wheel 66, which is adapted to drive by means of a sprocket chain 67 a sprocket wheel 68 secured to a cross shaft 69 extending transversely of the machine, and provided along its length with a series of twelve spiral gears 70. These spiral gears coöperate with worms 71 for the rotation of the spindles of the brush mechanisms now about to be described.

Before describing the brush mechanism, I will state that the movement of the ring structure one-eighth of a revolution brings the row of twelve bottles to the second station where it is presented to the water injectors or nozzles 36. At the next step or movement of the ring structure the row of bottles is brought to the third station in a vertical position ready to be acted upon by the brush mechanisms, in which operation the brushes are, at the proper time, inserted into the bottles, rotated therein with great speed and also reciprocated therein three times in the present instance.

Figures 15, 16, 17, 18:
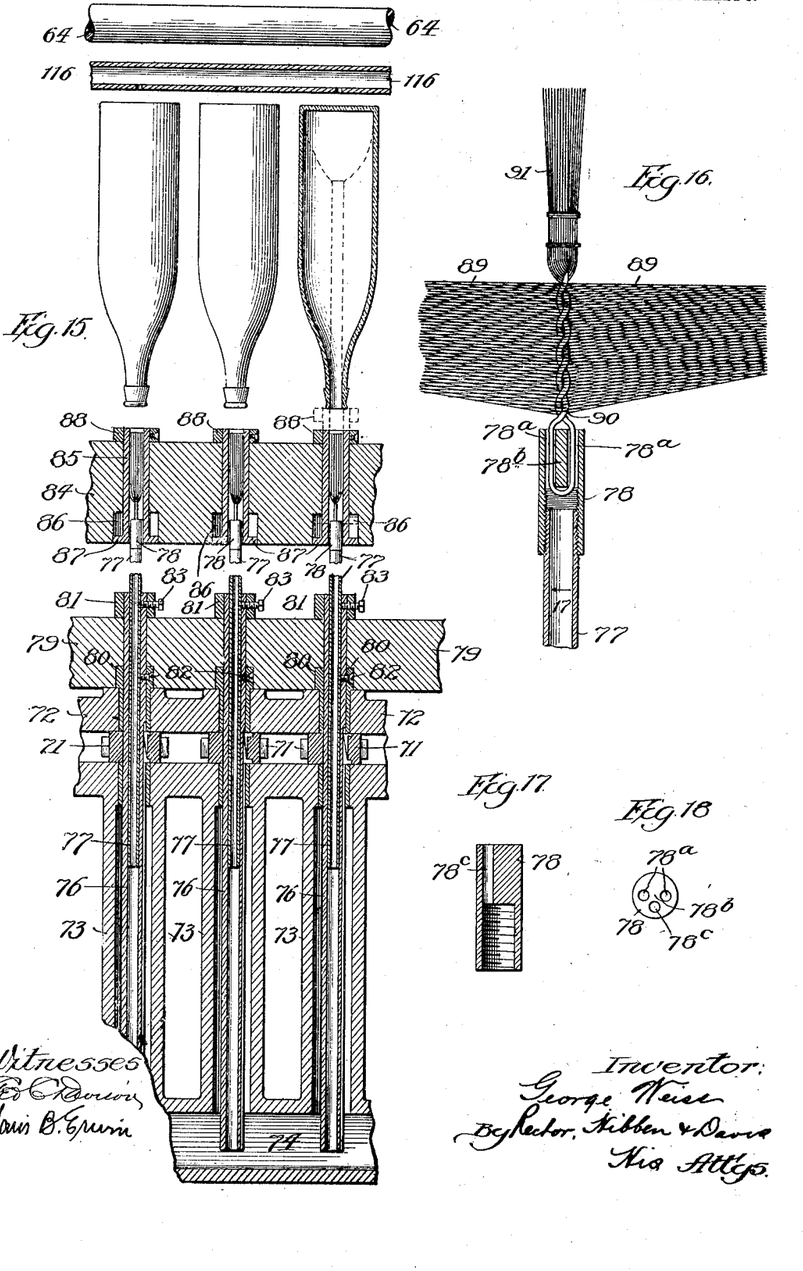
Fig. 15 an enlarged vertical section on the line 15—15 of Fig. 2.
Fig. 16 an enlarged detail view of one of the brushes.
Fig. 17 a détail view of one of the holders or heads for the brush.
Fig. 18 an end view of such holder.

Referring to the brush mechanisms in detail, inasmuch as each of the twelve mechanisms is the same in structure and operation, a description of one of them will suffice for all, particular reference being had to Figs. 2, 4, 15 to 18. The brush mechanisms are mounted in a frame 72 which extends transversely in the open center of the ring structure, portions of which frame are formed as cylinders 73 in which the brush spindles hereinafter mentioned reciprocate and all of which communicate at the lower end by means of a cross chamber 74 to which water is supplied in suitable manner as through a water supply connection 75, Fig. 4. In each of the cylinders 73 is positioned a guide-tube 76 extending into and communicating with the chamber 74. To this tube is secured the hollow spindle 77 of the brush, such spindle terminating in a removable head 78 to which the brush proper is secured. The tube 76, together with its brush spindle, is arranged to be reciprocated vertically and simultaneously rotated and to this end its spiral gear 71 is splined to such tube as indicated in Fig. 15. The tube and spindle are secured to a vertically reciprocated cross bar 79, which is common to all of the tubes and spindles which are here twelve in number. Each tube is operatively connected with such cross bar by means of the collars 80 and 81 having set screws 82 and 83 respectively which also serve to screw the tube and spindle together and in proper relative position. The head and upper end of the brush spindle extend through a stationary cross-piece 84 and in the present instance such head, together with its brush, pass through a bushing 85 which is loosely mounted in a vertical transverse bore in the cross piece 84 and having a vertical movement by reason of the counter-bore 86 in the cross piece and the marginal flange 87 on the lower end of the bushing, the downward movement of such bushing being limited by a collar 88, Fig. 15. This upward movement of the bushing is equal to the distance separating the mouth of the bottle from the collar 88, so that in its uppermost position it will contact the bottle and form a guide to the very mouth thereof. This bushing is very light in weight, being made in practice of aluminum, with the result that it will partake of both the rotary and the vertical movements of the brush so long as the latter is within it, with the result first that it will act as a guide for the brush to direct it into the bottle and second that it will prevent the friction between the bristles of the brush and the bushing and the consequent wearing of such bristles. It will be understood that in the lowermost position of the parts as indicated in Fig. 15 each brush is within its bushing 85, but upon the upward movement of the brush spindles the bushing will advance therewith and present the brush to the open mouth of the bottle, after which the brush will be moved outwardly from the bushing and into its bottle. Each brush is made of the peculiar form shown in Fig. 16, in which the same is illustrated as provided with a series of radial bristles 89 secured to the twisted wire frame 90 and the central brush portion 91 also secured to said frame. The inner end of the wire frame is formed as a loop which passes through the two holes 78$^a$, Figs. 16 and 18, and around the intermediate portion 78$^b$. The water is supplied upwardly through the hollow spindle and, while it is possible for sufficient water to pass through the holes 78$^a$ past the wire frame, yet I prefer to provide a special water supply hole or passage 78$^c$, as indicated in Figs. 17 and 18. The provision of the bushing 85 serves another purpose in that it causes the radial bristles 89 to enter the bottle end, with the result that after entering the same they will spread out along the inner walls of the bottle and their ends will contact and cleanse the bottom and inner corners of the bottle when the brush is fully inserted. In the withdrawal of the brush from its bottle, it will be withdrawn into the bushing rod for another insertion in a bottle from the next series or row of bottles. It will be understood that the water is supplied to the chamber 74 under pressure, so that the same will be forced upwardly through the tube and hollow spindle, and through the brush and into the bottle. In the present construction of machine as herein shown, the brushes are rotated at great speed and are given three complete strokes or reciprocations for each bottle, the driving connections being properly timed for such purpose. The brushes may be reciprocated in any suitable manner, but in the present instance I employ the following operating connections: The ends of the reciprocating bar 79 terminate in cross heads 92 which are movable in vertical guides 93 in the frame 30. These cross heads are connected by means of the pitmen 94 with crank disks 95 secured to the cross shaft 64. It will thus be seen, particularly by an inspection of Fig. 1, that the rotation of the disks 95 will cause a reciprocation of the transverse bar 79 and a consequent reciprocation of the brushes connected therewith. To accommodate different sizes of bottles I provide different lengths of pitmen and in order that the lowermost point or inward limit of throw of the cross head and the brushes shall be constant, I provide the crank disks 95 with a series of holes 95$^a$ as different points of attachment for the upper ends of the pitmen, (Fig. 1), the pitman shown being for the longest bottles. After the bottles have been thus submitted to the action of the brushes, the ring structure advances another eighth of a revolution, whereupon the bottles are presented to a series of water jets through nozzles 96 projecting radially from a suitable water supply pipe 97. While it is possible to govern the water supply and cause the water jets to act intermittently in the same manner as the water jets or nozzles 36 as hereinafter explained, yet in the present instance I have shown these water jets as continuously operating, any surplus water from this source as well as from the brushing operation being collected in the tank 29, and relieved by means of the overflow pipe 98, Fig. 2. An advancement of another eighth of a revolution brings the row or series of bottles being described to the ejecting mechanism which is 180 degrees from the receiving position, in which ejecting operation the bottles are delivered to a table 99 or any other suitable place.

As shown in Figs. 1, 2 and 3, the ejecting mechanism consists of a series of ejecting pins 100, which are here twelve in number, equal to the number of bottles in each row or series. These pins, which are adapted to reciprocate and to contact and thereby eject the bottles, are secured to a cross bar 101 which is provided at its ends with cross heads 102 adapted to reciprocate in the guides 103 formed in the frame 30. These cross heads are connected by means of the pitmen 104 with the mutilated gears 59 and operated thereby. These gears operate continuously, and consequently a continuous reciprocating movement is imparted to the ejecting pins, but the relative position of the active and inactive portions of the gears and the connection of the pitmen are such that the ring structure revolves only when the pins are withdrawn inwardly and out of the bottle chucks.

It will be understood that after the machine has been started in the operation the work of washing the bottles is automatic and practically continuous, the ring structure and the exterior bottle washing mechanism being intermittently operated, but being capable of rather rapid operation.

As hereinbefore stated, the connection of the water jets through the nozzles 39 is intermittent and as a simple means for this purpose I extend the one end of the shaft 35 into a casing 105 into which the water under pressure is admitted through a suitable supply pipe 106. The shaft 35, which is hollow at its end and along most of its length, is closed at its extreme end but provided at one point in its circumference with a slot 107 which at intervals is adapted to register with the corresponding slot 108 formed in the shell 109 forming a part of the bearing at the outer end of such shaft. These parts thus act as a valve for intermittently admitting the water under pressure to the hollow shaft 35 and consequently to its nozzles 36, the parts being so timed that the water jet operates at the moment when a row of bottles reaches its station and ceases to operate the moment when such row of bottles starts for the next station.

The mechanisms A, B and C operate in unison; that is, they are so related that the bottles, after being subjected to the first of them, will be passed on successively in proper time.

In addition to the driving connections already specifically described, I will state that the chains 8 of the endless conveyer are operated through the master shaft 53 by means of the chain 63 and usual driving connections hereinbefore referred to. As stated, this chain drives the cross-shaft 65ª, which is accomplished through the medium of the sprocket wheel 110 secured to such shaft, Figs. 1 and 3. The ends of this shaft are provided with pinions 111 which mesh with gears 112 mounted at opposite sides of the machine in short or stub shafts 113. The inner ends of these shafts are provided with sprocket wheels 114 which form the driving members for the chains 8 of such endless conveyer. The gears 112 are adjustable in order that the feed of the bottles may be accurately timed in relation to the mechanism C which received the bottles from the endless conveyer. Such gears permit of the proper adjustment for different sizes of bottles. As shown more particularly in Fig. 1. the gears 112 are formed in two parts, the hub portion 112ª of which is secured to its stub shaft, while the other gear portion 112ᵇ is mounted loosely thereon but adjustably secured by means of the bolts 115 adjustably secured in the slots 112ᶜ, Figs. 1 and 19.

Describing a complete operation of the machine and the action thereof on a series or row of twelve bottles, the bottles fall by gravity from the bottle soaking mechanism represented by A upon the inclined feed way 23, descending which they come within the range of the endless conveyer. At the proper time one of the cross bars 9 of this conveyer will contact the bottoms of series of the bottles and advance them forwardly and within the range of action of the first rotary brush 6. When the series or row of bottles is in the position indicated in Fig. 2 the endless conveyer will stop, during which time the rotary brush 6 will effectually cleanse the exterior of the body portion of the bottles which are moreover rotated by the series of rollers 25 so as to expose every portion of the sides of the bottle to the action of the brush. The endless conveyer which is thus intermittent in movement moves forwardly again and carries the bottles past and in contact with the second rotary brush 7. The next movement or step of the conveyer presents the series of bottles to one of the series of engaging heads or chucks mounted in the revolving ring-like structure or frame. This frame, which has an intermittent movement corresponding to that of the conveyer and in unison therewith, will move one-eighth of a revolution in a clockwise direction, Figs. 1 and 2, to the second station, at which it stops momentarily with the mouths of the bottles all presented to the water jets 36 which during the period of rest of the bottles at this station are supplied with water in automatic manner by means of the valve device at the left-hand end of the hollow shaft 35, Fig. 13. As a result the bottles are rinsed and cleansed of any of the soda solution that may remain in the bottles after leaving the soaking tank, so that there will be no soda solution to injuriously act upon the brushes in the succeeding operation. It will be understood that during this period of rest at the first station a second row or series of bottles is inserted in the next succeeding series of bottle chucks, which bottles have been acted upon in the same manner as the series now being followed through the machine. The frame now moves another one-eighth of a revolution, bringing the row of bottles in a vertical position with their mouths lowermost. As soon as these bottles reach this third station the series of brushes are reciprocated upwardly and inserted into the bottles and simultaneously rotated. At the moment when the bottles reach this station the brushes are confined within their bushings 85 with a clearnace space between the mouth of the bottles and the upper end of said bushings. The very first upward movement of the brushes carries the light bushings 85 with them as far as the mouths of the bottles, as shown in dotted lines in Fig. 15. The brushes continue to advance and thereupon pass out of their bushings and into the bottles. The radial portion or bristles 89 of the brushes have been held compressed with their ends outermost and practically in axial alinement with the brush spindles, but after insertion into the bottles such radial portions of the brushes will resume their normal radial position and will press against the inner walls of the bottles and, as the brushes are being rotated at great speed, such walls will be thoroughly brushed and cleansed. The upward movement of these brushes continuing, such radial portions of the brush will be directed against the bottom of the bottles and into the corners thereof which represents one of the most difficult problems in the brushing and cleansing of bottles. In the present instance I provide for three complete reciprocations of the brushes in the bottle, during all of which time the brushes are rapidly rotated. Moreover, it will be understood that the brush spindles being hollow and connected with the water chamber 74, they are supplied continually with water which is ejected to the brush head and through the brush in the operation described. By preference I provide for a subsequent rinsing of the bottles to clear them of any bristles that may have come from the brushes in the operation just explained, and to this end I provide the next station with water jets which in the present instance are constantly open and not regulated by valve mechanism as in the case of the first station, although obviously such mechanism may be provided if desired. The movement of the frame to the next station brings the series of bottles in line with the ejector mechanism whose series of pins will connect the mouths of the bottles and force them radially from the bottle chucks and on to any suitable table 99 or other receiving place. After the action of the machine has been started the series of bottles will be fed regularly to each series of bottle chucks, so that all of the chucks on the upper half of the frame will contain bottles while the chucks when passing the lower half thereof will be empty.

In practice the mechanism at C is provided with a hood or casing 115, underneath whose highest point at the middle of such mechanism and by preference a water sprinkler or sprayer 116 is arranged, Figs. 2 and 4.

The machine constructed and operating as hereinbefore described is wholly automatic and accommodates a large number of bottles, so that the output is considerable. Furthermore, the parts of the machine are so related and designed as to result in great compactness and simplicity considering the amount of work performed by the machine.

I claim:

1. In a bottle washing machine, the combination, with a rotating washing brush, of intermittently operating mechanism for feeding the bottles past the brush and arranged to stop the bottles in coöperative relationship with the brush, means for supporting the bottles in their travel, a rotating wheel arranged at the delivery end of said mechanism and having means for engaging the bottles by their necks, and mechanism mounted in said wheel for washing the interior of the bottles.

2. In a bottle washing machine, the combination, with a rotating washing brush, of intermittently operating mechanism for feeding the bottles past the brush and arranged to stop the bottles in coöperative relationship with the brush, consisting of an endless conveyer adapted to engage the bottles, means for supporting the bottles in their travel, a rotating wheel arranged at the delivery end of said mechanism and having means for engaging the bottles by their necks, and mechanism mounted in said wheel for washing the interior of the bottles.

3. In a bottle washing machine, the combination, with a rotating washing brush, of intermittently operating mechanism for feeding the bottles past the brush and arranged to stop the bottles in coöperative relationship with the brush, rollers forming grooved paths for the bottles at a point adjacent the brush, means for rotating the rollers, a rotating wheel arranged at the delivery end of said mechanism and having means adapted to engage the bottles by their necks and arranged in alinement with said grooved paths, and mechanism mounted in said wheel for washing the interior of the bottles.

4. In a bottle washing machine, the combination, with a rotating washing brush, of intermittently operating mechanism for feeding the bottles past the brush and arranged to stop the bottles in coöperative relationship with the brush, means for supporting the bottles in their travel, a rotating wheel arranged at the delivery end of said mechanism and having means for engaging the bottles by their necks, and mechanism mounted in said wheel for washing the interior of the bottles, said wheel having a step by step movement and arranged to be in a position of rest when the bottle feeding mechanism is moving and feeding bottles into said bottle engaging means of the wheel.

5. In a bottle washing machine, the combination of mechanism for washing the exterior of the bottles, mechanism for washing the interior thereof and provided with means for engaging the open ends of the bottles, and automatic means for feeding the bottles past the first named mechanism and into operative engagement with the other mechanism.

6. In a bottle washing machine, the combination of mechanism for washing the exterior of the bottles, mechanism for washing the interior thereof and provided with means for engaging the open ends of the bottle, and intermittently operating means for feeding the bottles past the first-named mechanism and into operative engagement with the other mechanism.

7. In a bottle washing machine, the combination of mechanism for washing the exterior of the bottles, mechanism for washing the interior thereof and provided with means for engaging the open ends of the bottle, and an intermittently operating conveyer adapted to engage the bottles past the first named mechanism and into operative engagement with the other mechanism.

8. In a bottle washing machine, means for washing the exterior of the bottles, mechanism for washing the interior thereof comprising a rotating frame having bottle engaging heads spaced equidistantly around the frame, and water jets associated with such heads for injecting water into the bottles, in combination with automatic means feeding the bottles past said washing means and into engaging heads.

9. In a bottle washing machine, means for washing the exterior of the bottles, mechanism for washing the interior thereof comprising a rotating frame having bottle engaging heads spaced equidistantly around the frame, water jets associated with such heads for injecting water into the bottles, in combination with automatic means feeding the bottles past said washing means and into engaging heads, and means for rotating the frame in proper time to receive the bottles from the feeding means.

10. In a bottle washing machine, means for washing the exterior of the bottles, mechanism for washing the interior thereof comprising a rotating frame having bottle-engaging heads spaced equidistantly around the frame, and alternating water jets and a brush device adapted to coöperate with the bottle when presented to them, in combination with means for feeding the bottles.

11. In a bottle washing machine, a feed table having a series of parallel grooves for the feeding of the bottles in parallel rows, means for washing the exterior of the bottles, mechanism for washing the interior thereof comprising a rotating frame having rows of bottle engaging heads spaced equidistantly around the frame to receive the rows of bottles, water jets for injecting water into the bottles, in combination with means for feeding the bottles past said washing means and into said heads.

12. In a bottle washing machine, the combination of a rotating frame, a series of bottle engaging heads spaced equidistantly around the frame to receive the bottles and forming different operating stations, water jets for injecting water into the bottles when presented, and means for feeding the bottles into said heads.

13. In a bottle washing machine, the combination of a rotating frame, a series of bottle engaging heads spaced equidistantly around the frame to receive the bottles and forming different operating stations, water jets for injecting water into the bottles when presented, and means for feeding the bottles into said heads, and means for rotating the frame intermittently and in time with the feeding means.

14. In a bottle washing machine, the combination of a rotating frame, a series of bottle engaging heads spaced equidistantly around the frame to receive the bottles and forming different operating stations, water jets and a brush device alternating with one another for cleaning the bottle interior when the bottles are presented thereto, in combination with means for feeding the bottles into said heads.

15. In a bottle washing machine, the combination of a rotating frame, a series of bottle engaging heads spaced equidistantly around the frame to receive the bottles and forming different operating stations, water jets and a brush device alternating with one another for cleaning the bottle interior when the bottles are presented thereto, and bottle ejector means, in combination with means for feeding the bottles into said heads.

16. In a bottle washing machine, the combination, with bottle holding means, of a brush capable of simultaneous rotation and reciprocation, and a bushing into which the brush is withdrawn when inoperative and which rotates with the brush, said bushing having a limited longitudinal movement for presenting the brush to the mouth of the bottle.

17. In a bottle washing machine, the combination, with bottle holding means, of a brush device comprising a hollow spindle in communication with a source of water supply, a brush at one end of the spindle, means for rotating the spindle and brush, means for reciprocating such spindle and brush, and a rotatable bushing into which the brush is withdrawable and which has a limited reciprocatory movement to present the brush in compressed form to the mouth of the bottle.

18. In a bottle washing machine, the combination, with bottle holding means, of a brush device comprising a hollow spindle in communication with a source of water supply, a brush at one end of the spindle, means for rotating the spindle and brush, means for reciprocating such spindle and brush, and a rotatable bushing into which the brush is withdrawable and which has a limited reciprocating movement, said brush having radial bristles which are compressed into axial alinement with the spindle when the brush is withdrawn into the bushing, whereby said bristles when inserted into the bottle will be directed toward the inner walls and bottom thereof.

19. In a bottle washing machine, the combination, with bottle holding means, of a brush device comprising a hollow spindle in communication with a source of water supply, a brush at one end of the spindle, means for rotating the spindle and brush, means for reciprocating such spindle and brush, a stationary bar having a counterbore transverse opening in axial alinement with the brush, and a bushing rotatable in such opening and provided with a flange coöperating with the counterbore to limit reciprocating movement of the bushing, the bushing being adapted to receive the brush and to rotate and partially reciprocate therewith.

20. In a bottle washing machine, the combination, with bottle holding means, of a brush device comprising a hollow spindle in communication with a source of water supply, a brush at one end of the spindle, means for rotating the spindle and brush, means for reciprocating such spindle and brush, a tube into which the spindle extends and to which it is secured, and a reciprocating member connected with the tube.

21. In a bottle washing machine, the combination, with means for holding a series of bottles, of a corresponding series of brush devices arranged in alinement, each comprising a hollow spindle, a brush at its outer end, a longitudinally movable guide for the brush, a reciprocating transverse bar to which the spindles are operatively connected, means operatively connected with the spindles for rotating them, and means for supplying water to the spindle.

22. In a bottle washing machine, the combination, with means for holding a series of bottles, of a corresponding series of brush devices arranged in alinement, each comprising a hollow spindle, a brush at its outer end, a longitudinally movable guide for the brush, a series of tubes in which the spindles are secured, a reciprocating bar to which the tubes are secured, a series of gears splined on the tubes, means for rotating the gears, and means for supplying water to the spindles.

23. In a bottle washing machine, the combination, with means for holding a series of bottles, of a corresponding series of brush devices, each comprising a hollow spindle, a brush at its outer end, a movable guide for the brush, a series of tubes in which the spindles are secured, a reciprocating bar to which the tubes are secured, a series of gears splined on the tubes, means for rotating the gears, a series of cylinders into which the tubes extend and which terminate in a common water chamber connecting with a source of water under pressure.

24. In a bottle washing machine, the combination of a rotating frame, a series of bottle engaging heads spaced equidistantly around the frame to receive the bottles and forming different operating stations, means for injecting water into the bottles and for brushing the same, and bottle ejector means comprising a series of pins movable radially of the frame, and means for operating such pins to contact the bottles and force them from engagement with said heads.

25. In a bottle washing machine, the combination of a rotating frame, a series of bottle engaging heads spaced equidistantly around the frame to receive the bottles and forming different operating stations, means for injecting water into the bottles and for brushing the same, and bottle ejector means comprising a series of pins movable radially of the frame, a cross bar on which the pins are mounted in parallel manner, and means for reciprocating said cross bar.

26. In a bottle washing machine, the combination of a rotating frame having a ring-like structure with an open center and mounted at its periphery for rotatory movement, a series of bottle engaging heads spaced around the frame to receive the bottles and forming different operating stations, means for intermittently operating the frame from station to station, washing devices located at said open center, and a bottle ejecting device also located at said center and having radially movable members to contact the bottles.

27. In a bottle washing machine, the combination of a rotating frame, a series of bottle engaging heads spaced equidistantly around the frame to receive the bottles and forming different operating stations, means for injecting water into the bottles and for brushing the same, and bottle ejector means comprising a series of pins movable radially of the frame, and means for operating such pins to contact the bottles and force them from engagement with said heads, said operating means including a pitman, and a mutilated gear coöperating therewith and having an active portion operatively connected with said frame for rotating it when said pins are withdrawn from the heads.

28. In a bottle washing machine, the combination of a rotating frame, a series of bottle engaging heads spaced equidistantly around the frame to receive the bottles and forming different operating stations, means for injecting water into the bottles and for brushing the same, and bottle ejector means comprising a series of pins movable radially of the frame, and means for operating such pins to contact the bottles and force them from engagement with said heads, said operating means including a cross-bar carrying the pins, a cross-head connected therewith, a pitman connected with the cross head, and a mutilated gear having an active portion operatively connected with said frame to provide therefor a step by step motion, said pitman being so connected with said gear that said pins are withdrawn from heads when the frame is moved.

29. In a bottle washing machine, a bottle holding chuck having jaws with a substantially universal movement.

30. In a bottle washing machine, a bottle holding chuck having jaws arranged to yield outwardly independently at their middle portions and at one end.

31. In a bottle washing machine, a bottle holding chuck comprising a casing having a bottle opening, oppositely disposed jaws located therein and mounted to oscillate toward and away from each other and also independently movable radially as to one end.

32. In a bottle washing machine, a bottle holding chuck comprising a casing having a bottle opening, oppositely disposed jaws located therein, spring-pressed pins 43 on which such jaws are mounted to oscillate, and spring-pressed pins 48 bearing against the front end of such jaws.

33. In a bottle washing machine, a bottle holding chuck comprising a casing having a bottle opening, oppositely disposed jaws located therein, spring-pressed pins 43 on which such jaws are mounted to oscillate, and spring-pressed pins 48 bearing against the front end of such jaws, said jaws having swelled portions 51.

34. In a bottle washing machine, a bottle holding chuck comprising a casing having a bottle opening, oppositely disposed jaws located therein, spring-pressed pins 43 on which such jaws are mounted to oscillate, and spring-pressed pins 48 bearing against the front end of such jaws, said jaws having shoulders 52 at their inner ends to engage the bottle flange.

35. In a bottle washing machine, a bottle holding chuck comprising a casing having a bottle opening, oppositely disposed jaws located therein, spring-pressed pins 43 on which such jaws are mounted to oscillate, and spring-pressed pins 48 bearing against the front end of such jaws, said jaws having swelled portions 51 at their outer ends and shoulders 52 at their inner ends.

GEORGE WEISS.

Witnesses:
  Louis B. Erwin,
  S. E. Hibben.